(12) United States Patent
Braganza et al.

(10) Patent No.: US 11,808,112 B2
(45) Date of Patent: Nov. 7, 2023

(54) EXOTHERMIC AND/OR GAS-GENERATING TREATMENT FOR SUBTERRANEAN AND PIPELINE OPERATIONS

(71) Applicant: Halliburton Energy Services, Inc., Houston, TX (US)

(72) Inventors: Giselle Braganza, Aberdeen (GB); Iain J. Shepherd, Aberdeen (GB); Graham Jack, Aberdeen (GB)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/680,863

(22) Filed: Feb. 25, 2022

(65) Prior Publication Data

US 2023/0272694 A1 Aug. 31, 2023

(51) Int. Cl.
*E21B 36/00* (2006.01)
*E21B 41/02* (2006.01)
*E21B 43/241* (2006.01)

(52) U.S. Cl.
CPC ............ *E21B 36/008* (2013.01); *E21B 41/02* (2013.01); *E21B 43/241* (2013.01)

(58) Field of Classification Search
CPC ....... E21B 36/008; E21B 41/02; E21B 43/241
See application file for complete search history.

(56) References Cited

U.S. PATENT DOCUMENTS

| | | | | |
|---|---|---|---|---|
| 5,183,581 A | * | 2/1993 | Khalil | ...................... B08B 9/027 134/40 |
| 7,398,825 B2 | * | 7/2008 | Nguyen | .................. E21B 43/26 507/224 |
| 7,624,743 B2 | | 12/2009 | Sarkar et al. | |
| 9,657,552 B2 | | 5/2017 | Kumar et al. | |
| 9,976,073 B2 | | 5/2018 | Salla et al. | |
| 10,060,237 B2 | * | 8/2018 | Mazyar | ................... C09K 8/524 |
| 2008/0217012 A1 | | 9/2008 | Delorey et al. | |
| 2011/0114323 A1 | | 5/2011 | Jennings et al. | |
| 2011/0232907 A1 | * | 9/2011 | Bryant | .................. E21B 43/267 166/300 |
| 2014/0090839 A1 | | 4/2014 | Al-Nakhli et al. | |
| 2014/0166286 A1 | * | 6/2014 | Nguyen | .................. E21B 43/26 166/300 |

(Continued)

FOREIGN PATENT DOCUMENTS

WO 2017039652 A1 3/2017

OTHER PUBLICATIONS

"Sure ThermTM Thermal Cleaning Services", Halliburton Technology Bulletin No. SMA-18-010, Jan. 7, 2019, 19 pages.

(Continued)

*Primary Examiner* — Silvana C Runyan
(74) *Attorney, Agent, or Firm* — Kilpatrick Townsend & Stockton LLP

(57) ABSTRACT

Methods including generating heat and/or gas in subterranean operations, pipelines, and other related applications. In some embodiments, the methods include providing treatment composition including a carrier fluid, a catalyst, a first reactant, a second reactant, a solvent, an emulsifier, and a foaming agent, wherein the first and second reactants are capable of reacting in an exothermic chemical reaction; and introducing the treatment composition into at least a portion of a conduit or container having a temperature of less than 30° C.

20 Claims, 1 Drawing Sheet

(56) References Cited

U.S. PATENT DOCUMENTS

| | | |
|---|---|---|
| 2015/0176381 A1 | 6/2015 | Chakrabarty |
| 2017/0073571 A1* | 3/2017 | Salla ................. E21B 37/06 |
| 2019/0144737 A1* | 5/2019 | Morales ............. C09K 8/584 |
| | | 166/305.1 |
| 2019/0300779 A1 | 10/2019 | Yu et al. |

OTHER PUBLICATIONS

International Search Report and Written Opinion, PCT/US2022/018143, dated Nov. 16, 2022, 11 pages.

* cited by examiner

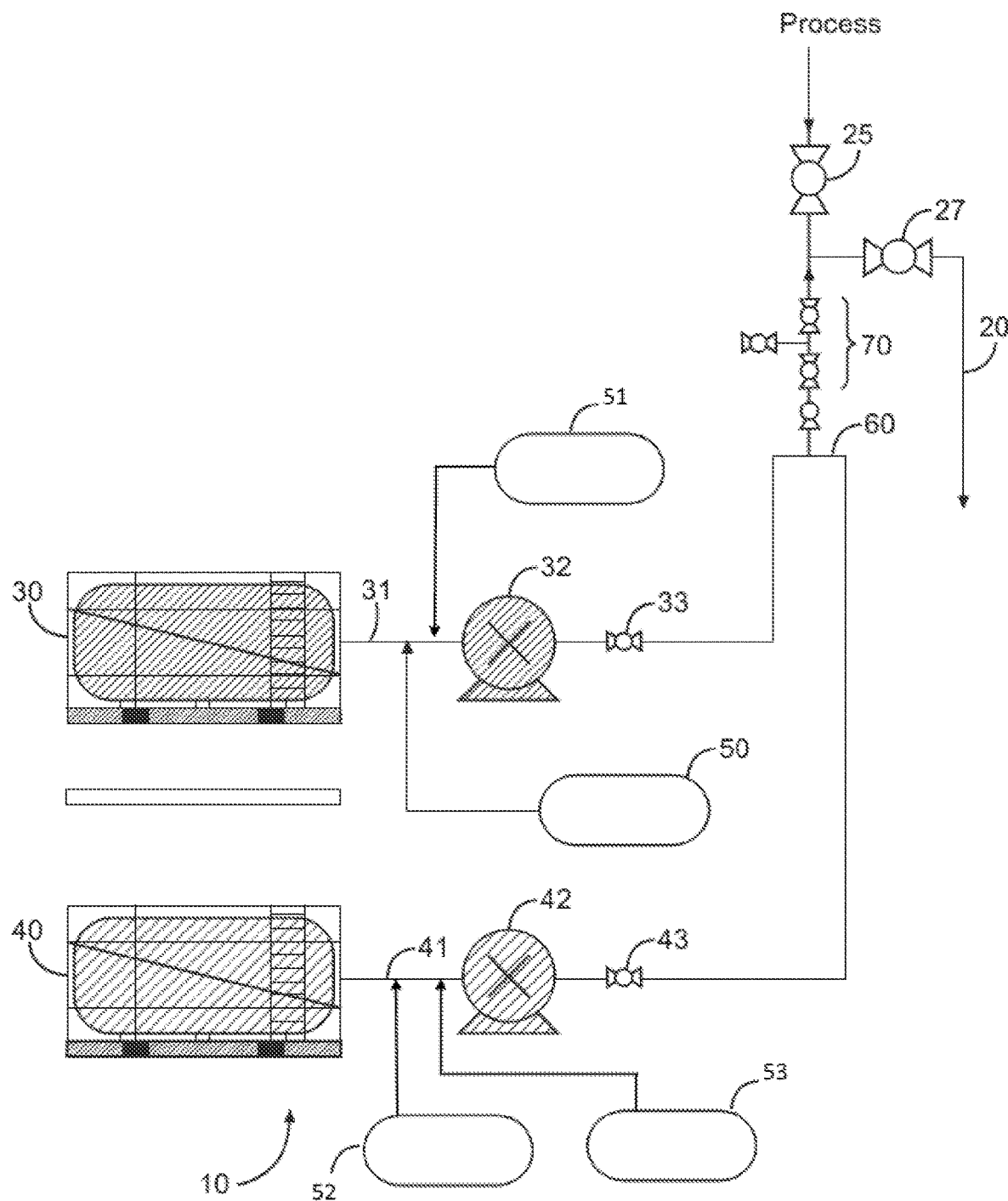

EXOTHERMIC AND/OR GAS-GENERATING TREATMENT FOR SUBTERRANEAN AND PIPELINE OPERATIONS

BACKGROUND

The present disclosure relates to methods and systems for generating heat and/or gas in subterranean operations, pipelines, processing equipment, and other applications.

Hydrocarbons and other fluids produced from and injected into subterranean formations or gathering and processing facilities often contain paraffin wax, scales, hydrates, asphaltenes and other contaminants. These may be dissolved in the flow stream at higher temperatures and/or pressures. However, these contaminants may precipitate or settle out into solid deposits, for example, when the pressure and temperature is lowered or other flow conditions change. The presence of these deposits in isolation or in agglomeration in wellbores, tubing, and/or pipelines may obstruct the flow of oil and/or other fluids, lowering production or injection throughput.

Mechanical methods for cleaning pipelines include running a mechanical "pig" through the pipeline to scrape the inner walls. However, such treatments may not work for all types of pipeline fouling and types of pipelines. For example, many pipelines do not have the necessary equipment to launch and retrieve the mechanical pig and/or may not be configured to be treated with a mechanical pig or may be almost completely blocked with deposits preventing the passage of a mechanical pig. The use of steel or flexible composite tubing with or without jet heads for cleaning may require the use of expensive, large scale, and/or dedicated equipment.

Existing chemical methods for cleaning pipelines such as a solvent soak may expensive and unsuitable for certain pipelines and conditions. Other chemical methods for cleaning pipelines may be ineffective in low-temperature conditions, and/or may generate pressure spikes in conduits or other fluid vessels. Additionally, some heat-based chemical cleaning methods may allow for pipeline contaminants (e.g., paraffin wax) to fall out of solution once the fluid cools.

BRIEF DESCRIPTION OF THE DRAWINGS

These drawings illustrate certain aspects of some of the embodiments of the present disclosure and should not be used to limit or define the claims.

FIG. 1 is a diagram illustrating an example injection system used in accordance with certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure. As used herein, terms such as "first" and "second" are arbitrarily assigned and are merely intended to differentiate between two or more reactants. It is to be understood that the words "first" and "second" serve no other purpose and are not part of the name or description of the reactant. Furthermore, it is to be understood that that the mere use of the term "first" and "second" does not require that there be any "third" or further reactant, although that possibility is contemplated under the scope of the present invention.

To facilitate a better understanding of the present disclosure, the following examples of certain embodiments are given. In no way should the following examples be read to limit, or define, the scope of the invention. Embodiments of the present disclosure involving wellbores may be applicable to horizontal, vertical, deviated, or otherwise nonlinear wellbores in any type of subterranean formation. Embodiments may be applicable to any wells, including, but not limited to injection wells, monitoring wells, and production wells, including hydrocarbon or geothermal wells. Embodiments of the present disclosure may also be applicable to pipelines (e.g., buried pipelines, subsurface pipelines, onshore pipelines, subsea pipelines, offshore pipelines, riser lines, flowlines, piping, and the like), process equipment, manifolds, tanks or any fluid transport, processing or storage vessel. Embodiments may be applicable to any pipelines or processing facilities, including, but not limited to injection, monitoring, and production, including hydrocarbon, water, $CO_2$, hydrogen, geothermal or any other fluid, (definition of fluid includes gases).

The present disclosure relates to methods and systems for generating heat and/or gas in subterranean operations, pipelines, and other related applications. The treatment compositions of the present disclosure generally include: a carrier fluid, a catalyst, a first reactant, a second reactant, a solvent, an emulsifier, and a foaming agent, wherein the first and second reactants are capable of reacting together in an exothermic chemical reaction and/or to produce nitrogen gas or other gases, and in some embodiments may be selected based on that capability. The methods of the present disclosure generally includes introducing such a treatment composition into at least a portion of a wellbore, subterranean formation, and/or pipeline, where the heat generated may be used for one or more applications, treatments, and/or operations therein. In certain embodiments, the reaction of the first and second reactants also or alternatively may produce a gas (e.g., nitrogen), which may be used for one or more applications, treatments, and/or operations as well.

Among the many advantages to the compositions and methods of the present disclosure, only some of which are alluded to herein, the compositions and methods of the present disclosure may, among other benefits, enable and/or enhance the use of such chemically-activated treatments in conduits and containers, as well as deep areas of wellbores and/or subterranean formations. In some embodiments, the methods and compositions of the present disclosure may allow for activation of the chemically-activated treatments even in low-temperature applications (e.g., permafrost regions, subsea, or other low-temperature environments). In certain embodiments, the methods and compositions of the present disclosure may be more environmentally-friendly than other acids used with chemically-activated treatments. In certain embodiments, the methods and compositions of the present disclosure may permit operators to more accurately control the amount of heat produced by the exothermic reaction, which may facilitate the use of chemically-activated treatments in permafrost regions or other heat-sensitive environments. The reaction products of the exothermic reactions in certain embodiments of the present disclosure also may cause less damage to the formation (e.g., precipitates, corrosion, etc.) as compared to conventional treatments. In some embodiments, the methods and compositions of the present disclosure of the present disclosure may provide improved contact between the solvent and the pipeline fouling or contaminant by forming an emulsion including the carrier fluid and the solvent (e.g., paraffin wax, tar, asphaltenes, scales, hydrates). Additionally, the methods and compositions of the present disclosure may, in some embodiments, dissolve or mobilize contaminants or deposits that have been removed by the exothermic reaction and/or prevent it from falling out of solution or redepositing as the fluid is transported along or out of the conduit or container. In certain embodiments, the methods and compositions of the present disclosure may promote the formation of a foamed fluid using the nitrogen or other gases generated as part of the exothermic reactions of the chemically-activated treatment. The formation of the foamed fluid may, in certain embodiments, help control the reaction rate, energize the foamed fluid, and/or help dissipate the heat generated by the exothermic reaction.

The first and second reactants may include any reactants that react in the presence of an acid to produce heat and/or nitrogen or other gases. In certain embodiments, the first reactant includes a source of cations (e.g., ammonium ions), and the second reactant includes a source of anions (e.g., nitrite ions). In certain embodiments of the present disclosure, the first and second reactants may include sodium nitrite and ammonium chloride, respectively, which react according to Equation (1) below to produce heat and nitrogen gas.

$$NaNO_2 + NH_4Cl \rightarrow NaCl + H_2O + N_2 \qquad (1)$$

The reaction in Equation (1) typically takes place at a pH of about 5 or lower. In other embodiments, the ammonium chloride in Equation (1) above may be replaced with magnesium ammonium phosphate (e.g., struvite). Examples of other exothermic reactions that may be used in accordance with certain embodiments of the present disclosure include Grignard reactions, as well as the reactions shown in Equations (2) and (3) below.

$$H_2O_2 + Fe^{2+} \rightarrow Fe^{3+} + HO^- + HO^* \qquad (2)$$

$$2NH_3(g) + CO_2(g) \rightarrow H_2NC(O)NH_2(s) + H_2O(l) \qquad (3)$$

In certain embodiments, the first and/or second reactants may be provided in a solid form, among other reasons, to help control the exothermic reaction so that the heat of reaction energy is released over a period of time instead of as an energy spike, although controlling the mixing of the reactants may substantially affect the total amount of heat that is generated. In certain embodiments, at least one of the reactants may be embedded in a solid matrix including a material that helps delay the release of the reactant. In certain embodiments at least one of the reactants can be encapsulated with an encapsulating material to form a solid capsule for the reactant. In still other embodiments, embedding at least one of the reactants in a solid matrix can be further combined with encapsulation of at least some of the reactant that is embedded in a solid matrix, among other reasons, to provide additional control over the timing of the exothermic reaction.

In certain embodiments, the first and second reactants may be provided in stoichiometric amounts based on their particular exothermic reaction. In certain embodiments, the first reactant and second reactants may be provided in solutions having molar concentrations of about 1.5M. In certain embodiments, the first and second reactants may be provided in solutions of molar concentrations of from about 0.01M to about 10M, 0.01M to about 9M, from about 0.01M to about 8M, from about 0.01M to about 7M, from about 0.01M to about 6M, from about 0.01M to about 5M, from about 0.01M to about 4M, from about 0.01M to about 3M, from about 0.01M to about 2M, or from about 0.01M to about 1M. A person of skill in the art with the benefit of the present disclosure will recognize the appropriate amounts of the first and second reactants to use for a particular application.

The contaminants treated by the methods and compositions of the present disclosure may include paraffin, asphaltene, tar, scale, a hydrate, and the like, and any combination thereof. The contaminants may be present in a fluid as a liquid or solid and/or may be present as a deposit on one or more surfaces of a conduit, container, wellbore, or subterranean formation. The scale contaminants of the present disclosure may include solids that precipitate out of solution or accumulate on equipment surfaces, conduit surfaces, or subterranean surfaces. In certain embodiments, the scale may include a mineral or solid that is formed due to scale-forming ions that are present in a fluid, including, but not limited to $Fe^{2+}$, $Ca^{2+}$, $Mg^{2+}$, $Sr^{2+}$, and $Ba^{2+}$. Examples of scale include, but are not limited to carbonate salts, sulfate or sulfide salts, such as $BaSO_4$, $SrSO_4$, $CaSO_4$, and $CaCO_3$. The hydrate contaminants of the present disclosure may include solids that may agglomerate in a fluid that is flowing or is substantially stationary, under certain temperature and pressure conditions. For example, hydrates may form when water molecules become bonded together after coming into contact with certain "guest" gas or liquid molecules. Hydrogen bonding causes the water molecules to form a regular lattice structure, like a cage, that is stabilized by the guest gas or liquid molecules entrapped within the lattice structure. The resulting crystalline structure may precipitate as a solid gas hydrate. Guest molecules can include any number of molecules such as, for example, carbon dioxide, methane, ethane, butane, propane, hydrogen, helium, freon, halogen, noble gases, and the like.

The catalyst may be an additive or compound that facilitates the exothermic reaction. For example, in certain embodiments, the catalyst may be a low temperature activator that allows the exothermic reaction to occur even at temperatures that are too low for the reaction to occur in the absence of a catalyst. In some embodiments, for example, the exothermic reaction (and/or the treatment of contaminants described herein) may occur at temperatures of less than 40° C., less than 35° C., less than 30° C., less than 25° C., or less than 20° C. In certain embodiments, the treatment composition may be introduced into or may contact a portion of a conduit or container having a temperature of less than 40° C., less than 35° C., less than 30° C., less than 25° C., or less than 20° C. In some embodiments, the treatment composition may be introduced into or contact a portion of a subterranean formation and/or wellbore having a temperature less than 40° C., less than 35° C., less than 30° C., less than 25° C., or less than 20° C.

In some embodiments, the treatment composition may be introduced into or contact a fluid having a temperature less than 40° C., less than 35° C., less than 30° C., less than 25° C., or less than 20° C. In some embodiments, the treatment composition may be exposed to certain temperatures less than 40° C., less than 35° C., less than 30° C., less than 25° C., or less than 20° C. upon introduction into an umbilical, injection point, conduit, processing equipment, conduit, or the like.

Examples of catalysts suitable for certain embodiments of the present disclosure include, but are not limited to a delayed-release acid component, an encapsulated pH buffer, an encapsulated acid component, an encapsulated persulphate, and any combination thereof.

The delayed-release acid component generally includes any compound that at least partially hydrolyzes in water to release an acid. Examples of delayed-release acid components that may be suitable for use in the present disclosure include, but are not limited to, esters, formates, lactic acid derivatives, methyl lactate, ethyl lactate, propyl lactate, and butyl lactate. Other suitable delayed-release acid components include: formate esters including, but not limited to, ethylene glycol monoformate, ethylene glycol diformate, diethylene glycol diformate, glyceryl monoformate, glyceryl diformate, glyceryl triformate, triethylene glycol diformate and formate esters of pentaerythritol. Examples of esters also include esters or polyesters of glycerol including, but not limited to, tripropionin (a triester of propionic acid and glycerol), trilactin, and esters of acetic acid and glycerol such as monoacetin, diacetin, and triacetin. In certain embodiments, the delayed-release acid component may include aliphatic polyesters; poly(lactides); poly(glycolides); poly($\varepsilon$-caprolactones); poly(hydroxy ester ethers); poly(hydroxybutyrates); poly(anhydrides); aliphatic poly carbonates; poly(orthoesters); poly(amino acids); poly(ethylene oxides); and polyphosphazenes; or copolymers thereof. Derivatives and combinations of any of the aforementioned examples also may be suitable. For example, various combinations of the esters or polyesters of hydroxy acid and/or glycerol also may be employed to adjust the half-life of the hydrolysis reactions. The acid compound also may generate alcohols downhole that may be beneficial to the operation. In certain embodiments, the delayed-release acid component can be encapsulated with an encapsulating material to form a solid capsule. In other embodiments, the delayed-release acid component may not be encapsulated.

In certain embodiments, the delayed-release acid component may be provided in an amount necessary to produce the requisite drop in pH to trigger the exothermic reaction of the first and second reactants. In certain embodiments, the delayed-release acid component may be used in an amount of about 0.01% to about 40% by weight of the treatment composition. In some embodiments, the delayed-release acid component may be present in an amount of from about 1%, 2%, 3%, 4%, 5%, 6%, 7%, 8%, 9%, or 10%, to about 20%, 21%, 22%, 23%, 24%, 25%, 26%, 27%, 28%, 29%, 30%, 31%, 32%, 33%, 34%, 35%, 36%, 37%, 38%, 39%, or 40%, all by weight of the treatment composition. A person of skill in the art with the benefit of the present disclosure will recognize the appropriate amounts of the delayed-release acid component to use for a particular application.

In some embodiments, the catalyst may include an encapsulated acid component. Examples of acids suitable for certain embodiments of the encapsulated acid component include, but are not limited to mineral acids, organic acids, acidic anhydrides, p-toluenesulfonic acid, and any combination thereof. In certain embodiments, the encapsulated acid component may be encapsulated with an encapsulating material to form a solid capsule. In certain embodiments, the encapsulated acid component may be used in an amount of about 5% to about 40% by weight of the treatment composition. In some embodiments, the encapsulated acid component may be present in an amount of from about 1%, 2%, 3%, 4%, 5%, 6%, 7%, 8%, 9%, or 10%, to about 20%, 21%, 22%, 23%, 24%, 25%, 26%, 27%, 28%, 29%, 30%, 31%, 32%, 33%, 34%, 35%, 36%, 37%, 38%, 39%, or 40%, all by weight of the treatment composition. A person of skill in the art with the benefit of the present disclosure will recognize the appropriate amounts of the encapsulated acid component to use for a particular application.

In some embodiments, the catalyst may include a pH buffer. In certain embodiments, the pH buffer may adjust and/or maintain the pH of the fluid to at least substantially prevent the reaction of the first and second reactants until the desired treatment time when treatment is required or until the reactants reach the desired treatment area where treatment is required. Examples of pH buffers suitable for certain embodiments of the present disclosure include, but are not limited to sodium hydroxide, potassium carbonate, sodium bicarbonate, sodium carbonate, sodium oxide, potassium hydroxide, lithium hydroxide, and any combination thereof. In certain embodiments, the pH buffer is present in an amount in the range of from about 0.01% to about 20% by weight of the carrier fluid of the treatment composition. In some embodiments, the pH buffer may be present in an amount of from about 1%, 2%, 3%, 4%, or 5%, to about 10%, 11%, 12%, 13%, 14%, 15%, 16%, 17%, 18%, 19%, or 20%, all by weight of the carrier fluid of the treatment composition.

In certain embodiments, the catalyst may include an encapsulated persulfate. Examples of persulfates suitable for certain embodiments of the present disclosure include, but are not limited to sodium persulfate, potassium persulfate, ammonium persulfate, and any combination thereof. In certain embodiments, the persulfate is present in an amount in the range of from about 0.01% to about 30% by weight of the carrier fluid of the treatment composition. In some embodiments, the pH buffer may be present in an amount of from about 1%, 2%, 3%, 4%, or 5%, to about 10%, 11%, 12%, 13%, 14%, 15%, 16%, 17%, 18%, 19%, 20%, 21%, 22%, 23%, 24%, 25%, 26%, 27%, 28%, 29%, or 30%, all by weight of the carrier fluid of the treatment composition. In certain embodiments, the encapsulated persulfate may be encapsulated with an encapsulating material to form a solid capsule. In certain embodiments, the treatment composition may further include a non-encapsulated persulfate.

The solvent includes any solvent capable of at least partially, or substantially entirely, dissolving a contaminant or fouling (e.g., paraffin wax, asphaltene, tar, scale, hydrates). In certain embodiments, the solvent may keep the contaminant in solution and prevent it from redepositing. In some embodiments, the solvent may be an organic solvent. In certain embodiments, the solvent may be a liquid hydrocarbon solvent that is a liquid at standard temperature and pressure, and may help dissolve, mobilize, and/or remove the paraffins, asphaltenes, tar, scale, and/or hydrates. Examples of solvents suitable for certain embodiments of the present disclosure include, but are not limited to benzene, toluene, ethylbenzene, xylene, methanol, isopropyl alcohol, aromatic naphtha, mineral acids, organic acids, acetic anhydrides, p-toluenesulfonic acid, and the like, and any combination thereof. In some embodiments, the solvent may include an alcohol or a glycol. In some embodiments, the treatment composition may include a solvent or blend of solvents selected to dissolve the pipeline contaminants in a particular application (e.g., simple and/or complex paraffins, asphaltenes, tar, scale, hydrates). In certain embodiments, the treatment composition may include a solvent or blend of solvents selected based, at least in part, on one or more conditions (e.g., temperature, pressure, fluid composition) in the conduit, container, or subterranean formation. In some embodiments, the solvent may not include a liquid hydrocarbon, or may not include a significant amount of a liquid hydrocarbon. In some embodiments, the treatment composition may not include a liquid hydrocarbon, or may not include a significant amount of a liquid hydrocarbon.

In certain embodiments, the solvent may be present in the treatment composition provided in an amount necessary to at least partially dissolve a pipeline contaminant (e.g., paraffin wax, asphaltene, tar, scale, hydrates) and/or keep such a contaminant dissolved during removal. In certain embodiments, the solvent is present in an amount in the range of from about 0.01% to about 50% by volume of the treatment composition. In one embodiment, the liquid surfactants are present in an amount in the range of from about 0.1% to about 40.0% by volume of the treatment composition, from about 10% to about 40.0% by volume of the treatment composition, or from about 20% to about 40.0% by volume of the treatment composition. A person of skill in the art with the benefit of the present disclosure will recognize the appropriate amounts of solvent to use for a particular application.

The emulsifier generally includes any compound or combination of compounds that would emulsify a fluid to form an emulsion with an aqueous continuous phase (e.g., an oil-in-water emulsion) or an invert emulsion with an oil or oleaginous fluid as the continuous phase. In certain embodiments, the emulsifier may be selected to distribute a solvent that is not miscible with water in an aqueous fluid, or to distribute a solvent that is not miscible with oil in an oleaginous fluid. Examples of emulsifiers that may be suitable for use in the present disclosure include, but are not limited to, fatty acid, carbohydrate compounds, ethoxylated alcohols, ethoxylated nonylphenols, and any combination or derivative thereof. In certain embodiments, suitable fatty acids may include a main aliphatic chain having about 4 to about 28 carbon atoms, or about 6 to about 18 carbon atoms, or about 6 to about 14 carbon atoms. One of ordinary skill in the art will recognize that the aliphatic chain of the fatty acids may include unsaturated linkages or saturated linkages. Examples of suitable fatty acids may include, but are not limited to, caprylic acid, capric acid, lauric acid, muriatic acid, palmitic acid, stearic acid, arachidic acid, behenic acid, lignoceric acid, cerotic acid, oleic acid, and the like.

In certain embodiments, the emulsifier may be provided in an amount necessary to form an emulsion with an aqueous continuous phase and a dispersed phase including the solvent. In some embodiments, the emulsifier may be provided in an amount necessary to form an emulsion with an aqueous dispersed phase and a continuous phase including the solvent. In certain embodiments, the emulsifier is present in an amount in the range of from about 0.01% to about 10% by volume of the treatment composition. In some embodiments, the emulsifier may be present in an amount of from about 0.01%, 0.1%, or 1%, to about 2%, 3%, 4%, 5%, 6%, 7%, 8%, 9%, 10%, 11%, 12%, 13%, 14%, 15%, 16%, 17%, 18%, 19%, or 20%, all by volume of the treatment composition. A person of skill in the art with the benefit of the present disclosure will recognize the appropriate amounts of the emulsifier to use for a particular application.

The foaming agent may help form and/or stabilize the foamed fluid formed in a conduit, container, or subterranean formation in one or more embodiments of the present disclosure. For example, in certain embodiments, the reaction of the first and second reactants may produce nitrogen or other gases that foam one or more fluids, and the foaming agent of the treatment composition may help the foamed fluid form and stabilize the foamed fluid. Examples of foaming agents suitable for certain embodiments of the present disclosure include, but are not limited to polyethylene glycol alkyl ether, alkoxylated alcohol ether sulfate, ethoxylated alcohols, betaines, salts of aliphatic sulfonic acids, or any combination thereof. In certain embodiments, the foaming agent may be provided in an amount necessary to form and/or stabilize a foamed fluid. In certain embodiments, the foaming agent is present in an amount in the range of from about 0.01% to about 10% by volume of the treatment composition. In one embodiment, the foaming agent present in an amount in the range of from about 0.1% to about 2.0% by volume of the foamed fluid. In some embodiments, the foaming agent may be present in an amount of from about 0.01%, 0.1%, or 1%, to about 2%, 3%, 4%, 5%, 6%, 7%, 8%, 9%, 10%, 11%, 12%, 13%, 14%, 15%, 16%, 17%, 18%, 19%, or 20%, all by volume of the foamed fluid. A person of skill in the art with the benefit of the present disclosure will recognize the appropriate amounts of the emulsifier to use for a particular application.

The carrier fluids used in the methods and compositions of the present disclosure generally include any aqueous fluid known in the art, including emulsions that include an aqueous phase. Aqueous fluids that may be suitable for use in the methods and compositions of the present disclosure may include water from any source. Such aqueous fluids may include fresh water, salt water (e.g., water containing one or more salts dissolved therein), brine (e.g., saturated salt water), seawater, produced water, or any combination thereof. Emulsions that may be suitable for use in the methods and compositions of the present disclosure may include oil-in-water emulsions or water-in-oil emulsions (i.e., invert emulsions), wherein the aqueous phase of the emulsion includes one or more aqueous fluids, including but not limited to those examples listed above. In certain embodiments, the density of the aqueous fluid can be adjusted, among other purposes, to provide additional particulate transport and suspension in the compositions of the present disclosure. In certain embodiments, the carrier fluid may further include a viscosifying agent, among other purposes, to help suspend solid material (e.g., the first and second reactants) in the carrier fluid. Examples of viscosifying agents that may be suitable for use in certain embodiments of the present disclosure include, but are not limited to, guar, guar derivatives, cellulose, cellulose derivatives, biopolymers, polysacchaarides, certain surfactants, synthetic polymers, acrylamides, acrylates, and the like. In certain embodiments, the viscosifying agent may further include a crosslinking agent. In certain embodiments, the treatment fluid may further include a breaker for the viscosifying agent.

The carrier fluid optionally may include one or more additional additives for a variety purposes in conjunction with a method or composition of the present disclosure. Examples of such additional additives include, but are not limited to, weighting agents, surfactants, additional emulsifiers, acids, fluorides, fluid loss control additives, gas, nitrogen, carbon dioxide, surface modifying agents, tackifying agents, additional foaming agents, corrosion inhibitors, scale inhibitors, catalysts, clay control agents, biocides, friction reducers, antifoam agents, bridging agents, dispersants, flocculants, $H_2S$ scavengers, $CO_2$ scavengers, oxygen scavengers, lubricants, viscosifiers, breakers, relative permeability modifiers, resins, particulate materials (e.g., proppant particulates), wetting agents, coating enhancement agents, filter cake removal agents, and the like. A person skilled in the art, with the benefit of this disclosure, will recognize the types of additives that may be included in the fluids of the present disclosure for a particular application, as well as the additives that may be less suitable for a particular application. For example, a person of skill in the art with the benefit of this disclosure will recognize that acidic additives may trigger the reaction of the first and second reactants prematurely in some cases. In certain embodiments, the carrier fluid may include additional alkaline base additives, among other reasons, to further delay the exothermic reactions that take place under acidic conditions.

As noted above, the delay and/or amount of heat and/or gases generated in the methods and compositions of the present disclosure may be adjusted for the requirements of a particular operation or treatment. This delay may be adjusted, for example, by selecting and/or varying the amounts of the first and/or second reactants, the amount and/or type of the delayed-release acid component, the addition of one or more additional additives (e.g., a base), and other factors. For example, in certain embodiments, one or more of the first reactant, the second reactant, the delayed-release acid component are provided in an amount that is based at least in part on a predetermined amount of nitrogen or other gases to be produced by the chemical reaction and/or a predetermined amount of heat to be produced by the exothermic chemical reaction. A person of ordinary skill in the art with the benefit of this disclosure will recognize how to vary these parameters to produce the desired amount of heat and/or gases and the desired delay in the exothermic reaction In certain embodiments, the components of the treatment composition may be introduced into a subterranean formation or pipeline in a single carrier fluid. In other embodiments, two or more of those components may be introduced into a subterranean formation or pipeline separately (e.g., in separate carrier fluids), among other reasons, to prevent premature reaction of the reactants. The present disclosure in certain embodiments further provides methods of using the treatment composition of the present disclosure. In certain embodiments, the treatment composition may be introduced into the fluid through a conduit or an injection point. In certain embodiments, the treatment composition of the present disclosure may be introduced into a wellbore, a conduit, a vessel, and the like and may contact and/or be introduced into a fluid residing therein.

In certain embodiments, the methods and compositions of the present disclosure may enable a delay of more than about 1 hour from the time the reactants are mixed in a treatment fluid at temperatures of about 30° C. In certain embodiments, the delay may be about 4 hours at temperatures of about 30° C. In certain embodiments, the delay may be about 1 hour or more at temperatures of about 90° C.

In certain embodiments, the fluid into which the treatment composition is introduced may be flowing or it may be substantially stationary. The fluid may be within a vessel, or within a conduit (e.g., a conduit that may transport the fluid), or within a subterranean formation and/or a wellbore penetrating a portion of the subterranean formation. Examples of conduits include, but are not limited to, pipelines, production piping, subsea tubulars, process equipment (e.g., cooling towers, heat exchangers), and the like as used in industrial settings and/or as used in the production of oil and/or gas from a subterranean formation, and the like. The conduit may in certain embodiments penetrate at least a portion of a subterranean formation, as in the case of an oil and/or gas well. In particular embodiments, the conduit may be a wellbore or may be located within a wellbore penetrating at least a portion of a subterranean formation. Such oil and/or gas well may, for example, be a subsea well (e.g., with the subterranean formation being located below the sea floor), or it may be a surface well (e.g., with the subterranean formation being located belowground). A vessel or conduit according to other embodiments may be located in an industrial setting such as a refinery (e.g., separation vessels, dehydration units, pipelines, heat exchangers, and the like), or it may be a transportation pipeline.

In some embodiments, the treatment composition of the present disclosure initially may be incorporated into a separate fluid or additive composition prior to being introduced into the fluid, conduit, vessel, or formation. The separate fluid or additive composition may be any suitable composition in which the treatment composition may be included. For example, in some embodiments, the treatment composition may be added to a treatment fluid for use in a wellbore penetrating a subterranean formation during, for instance, oil and/or gas recovery operations.

In certain embodiments, the treatment composition of the present disclosure may be introduced into and/or contact a fluid present in a conduit, vessel, or formation that includes contaminants or pipeline fouling. In some embodiments, the treatment composition may be introduce into and/or contact such fluid in an amount from about 0.01% to about 5.5% by volume based on the volume of the fluid. In various embodiments, an effective amount of the treatment composition for at least partially removing pipeline fouling may be as low as any of: 0.01, 0.1, 0.25, 0.50, 0.75, 1.00, 1.25, 1.50, 1.75, 2.00, 2.25, and 2.50% by volume based on the volume of the fluid into which the treatment composition is introduced. An effective amount may be as high as any of: 0.50, 0.75, 1.0, 1.25, 1.50, 1.75, 2.0, 2.25, 2.50, 2.75, 3.0, 3.25, 3.50, 3.75, 4.0, 4.50, 5.0, and 5.50% by volume based on the volume of the fluid into which the treatment composition is introduced. Thus, in some embodiments, an effective amount of LDHI additives of the present disclosure for inhibiting, retarding, mitigating, reducing, controlling, delaying, and/or the like agglomeration of hydrates may be about 0.1% to about 3% volume; in other embodiments, about 0.1% to about 2% volume; in other embodiments, about 0.25% to about 1.5% volume; and in other embodiments, about 0.5% to about 1.0% volume, all based on the volume of the fluid into which the treatment composition is introduced. A person skilled in the art, with the benefit of this disclosure, would understand which concentrations of the treatment compositions will be effective for a given application.

In certain embodiments, the treatment composition of the present disclosure may be introduced into a wellbore, subterranean formation, vessel, and/or conduit (and/or into a fluid within any of the foregoing) using any method or equipment known in the art. For example, the treatment composition of the present disclosure may be applied to a subterranean formation and/or wellbore using batch treatments, squeeze treatments, continuous treatments, and/or any combination thereof. In certain embodiments, a batch treatment may be performed in a subterranean formation by stopping production from the well and pumping the treatment composition into a wellbore, which may be performed at one or more points in time during the life of a well. In other embodiments, a squeeze treatment may be performed by squeezing the treatment composition downhole into the formation. In other embodiments, a treatment composition of the present disclosure may be injected into a portion of a subterranean formation using an annular space or capillary injection system to continuously introduce the treatment composition into the formation. In certain embodiments, a composition (such as a treatment fluid) including a treatment composition of the present disclosure may be circulated in the wellbore using the same types of pumping systems and equipment at the surface that are used to introduce treatment fluids or additives into a wellbore penetrating at least a portion of the subterranean formation.

In certain embodiments, the methods of the present disclosure include applying the treatment composition to a fluid. In certain embodiments, the fluids or treatment compositions may be formed at a well site where the operation or treatment is conducted, either by batch mixing or continuous ("on-the-fly") mixing. The term "on-the-fly" is used herein to include methods of combining two or more components (e.g., the first and second reactants, carrier fluids, emulsifiers, catalysts, foaming agents, and/or solvents) wherein a flowing stream of one element is continuously introduced into a flowing stream of at least one other component so that the streams are combined and mixed while continuing to flow as a single stream as part of the on-going treatment. Such mixing can also be described as "real-time" mixing. In other embodiments, the treatment fluids of the present disclosure may be prepared, either in whole or in part, at an offsite location and transported to the site where the treatment or operation is conducted. In introducing a composition of the present disclosure into a vessel, conduit (e.g., an umbilical, capillary, pipeline, or tubing), wellbore, portion of a subterranean formation, components of the composition may be mixed together at the surface and introduced into the vessel, conduit, wellbore, and/or formation together, or one or more components may be introduced into the vessel, conduit, wellbore, and/or formation at the surface separately from other components such that the components mix or intermingle in a portion of the vessel, conduit, wellbore, and/or formation to form a composition. In either such case, the composition is deemed to be introduced into at least a portion of the vessel, conduit, wellbore, and/or subterranean formation for purposes of the present disclosure.

In certain embodiments, a treatment composition of the present disclosure may be added to a conduit such as a pipeline where one or more fluids enter the conduit and/or at one or more other locations along the length of the conduit. In such embodiments, the treatment composition may be added in batches or injected substantially continuously while the pipeline is being used.

The methods and compositions of the present disclosure may be used during or in conjunction with any subterranean operation. Suitable subterranean operations may include, but are not limited to, preflush treatments, afterflush treatments, drilling operations, hydraulic fracturing treatments, sand control treatments (e.g., gravel packing), acidizing treatments (e.g., matrix acidizing or fracture acidizing), "frac-pack" treatments, clean-up treatments, conformance treatments, diversion treatments, consolidation treatments, and other operations where a treatment composition of the present disclosure may be useful.

In one embodiment, the methods and compositions of the present disclosure may be used in conjunction with treatments used to remove and/or inhibit the formation of paraffin wax, asphaltenes, scale, hydrates (e.g., gas hydrates), and/or tar precipitates (e.g., deposits) in conduits, containers (e.g., shipment containers), tubulars, subterranean formations, wellbores, and/or pipelines carrying hydrocarbons, for example, in hydrocarbon production, transportation, and/or refining operations. For example, a treatment composition including a carrier fluid, a catalyst, a first reactant, a second reactant, a solvent, an emulsifier, and a foaming agent, wherein the first and second reactants are capable of reacting together in an exothermic chemical reaction may be introduced into a portion of a conduit, container, tubular, subterranean formation, wellbore, or pipeline through which hydrocarbons flow. The exothermic reaction of the first and second reactants generates heat that increases the solubility of paraffins, asphaltenes, scale, hydrates, and/or tar in the fluids flowing in that area. After introducing the treatment composition into the subterranean formation, tubular, wellbore, or pipeline, the pH of the fluid may be reduced to a level at which the exothermic reaction of the first and second reactants occurs, for example by the catalyst. The heat generated in the exothermic reaction heats the area to help melt or otherwise remove the paraffins, asphaltenes, scale, hydrates, and/or tar. The solvent of the treatment composition may help dissolve and remove the paraffins, asphaltenes, scale, hydrates, and/or tar. The carrier fluid may then be displaced from the section of conduit and help remove the paraffins, asphaltenes, scale, hydrates, and/or tar from subterranean formation, tubular, wellbore, or pipeline. The solvent may help hold the paraffins, asphaltenes, scale, hydrates, and/or tar in solution and prevent the paraffins, asphaltenes, and/or tar from falling out of solution while the carrier fluid is displaced from the treatment area.

In some embodiments, the methods and compositions of the present disclosure may be used in conjunction with other equipment and/or treatment methods for removing and/or inhibiting paraffins, asphaltenes, scale, hydrates, and/or tar in conduits or containers. For example, in certain embodiments, the methods and compositions of the present disclosure may be used in conjunction with the use of mechanical methods for cleaning conduits and containers such as pigging, coiled tubing, steel or composite tubing, and the like.

In certain embodiments, the methods and compositions of the present disclosure may be effective in very long pipelines or wellbores such as long horizontals and deep water wells at least in part because of the controllable and/or extended delay provided by the delayed acid-generating components used herein. In certain embodiments, the amount of heat generated using the methods and compositions of the present disclosure can be tailored and/or customized for the nature and/or amount of paraffins, asphaltenes, scale, hydrate, and/or tar deposits that must be dissolved or removed in a particular treatment. This may be accomplished, for example, by using a computer program as further described below. Moreover, in certain embodiments, nitrogen or other gases may be produced as a byproduct of the exothermic reaction, and gas bubbles may help to mechanically dislodge or break up paraffin, asphaltene, scale, hydrate, and/or tar deposits in a subterranean formation, tubular, wellbore, or pipeline. In certain embodiments, nitrogen or other gas generation may be used in dewatering applications. The foaming agent may, in certain embodiments, promote formation of a foamed carrier fluid with the gas generated by the exothermic reaction. Among other advantages of the methods and compositions of the present disclosure, the formation of the foamed fluid may help control the rate of the exothermic reaction, at least partially reduce the pressure buildup in the conduit or container compared, and/or at least partially dissipate the heat generated by the reaction, as compared to the conditions that would occur if a treatment composition without the foaming agent.

In another embodiment, the methods and compositions of the present disclosure may be used in conjunction with fluid diversion or conformance treatments used to direct treatment fluids and/or additives to targeted zones in a subterranean formation or wellbore, particularly in horizontal wells with long laterals. In such circumstances, a treatment fluid may dissipate in portions of the formation or wellbore requiring less force to penetrate them (e.g., a heel portion of a lateral, or a more permeable portion of a formation), while other areas of the formation or wellbore (e.g., the toe portion of a lateral, or a less permeable portion of a formation) may not be treated effectively.

In another embodiment, the methods and compositions of the present disclosure may be used in conjunction with consolidation treatments used to consolidate sands and/or loose particulates in a subterranean formation to prevent flowback of those materials from a well. As noted above, in certain embodiments of the present disclosure, the exothermic reaction of the first and second reactants may generate nitrogen or other gases. Such gas may be used, among other purposes, to generate a foamed fluid, which may be used in fracturing operations, fluid diversion, or other subterranean treatments. For example, a treatment composition including a carrier fluid, a delayed-release acid component, a first reactant, a second reactant, a solvent, an emulsifier, and a foaming agent, wherein the first and second reactants are capable of reacting together in an exothermic chemical reaction may be introduced into a portion of a subterranean formation in which hydrocarbons are to be produced. The reaction of the first and second reactants may produce nitrogen or other gas that foams one or more fluids in the portion of the formation. This may generate an increase in the pressure exerted on the subterranean formation, which may create and/or enhance one or more fractures in the formation. In another embodiment, the foamed fluid may act as a diverting agent to divert the flow of other fluids to another portion of the subterranean formation (e.g., a less permeable portion of the subterranean formation). The foaming agent may help form and/or stabilize the foamed fluid. In other embodiments, nitrogen or other gas generated using a method or treatment composition of the present disclosure may be used to assist in returning wells to production, drillstem or production testing of heavy oil reservoirs, back surging, wax removal, artificial gas lift applications, formation consolidation, fluid diversion, conformance, and other types of operations. Nitrogen or other gas also may be used to aid in the back production of liquid from a wellbore penetrating a portion of a subterranean formation and help prevent the formation of water blocks therein. In these and other applications, it may be advantageous to generate such nitrogen or other gas in situ using a reaction between a first and second reactant triggered by, among other reasons, to reduce the amount of friction in pumping a foamed fluid to a desired location downhole and/or to eliminate the need for specialized equipment needed to store, maintain, and vaporize liquid nitrogen at a job site.

The methods and compositions disclosed herein may directly or indirectly affect one or more components or pieces of equipment associated with the preparation and/or delivery, the disclosed compositions. For example, and with reference to FIG. 1, the disclosed methods and compositions may directly or indirectly affect one or more components or pieces of equipment associated with an injection system 10, which may be used to pump a treatment composition of the present disclosure into a pipeline 20, according to one or more embodiments. Referring now to FIG. 1, an injection system 10 may be arranged to communicate with pipeline 20 at a suitable location, for example, where the hydrocarbons are introduced into the pipeline after processing. A valve 25 may regulate the flow of hydrocarbons from that source into the pipeline 20. A first tank 30 containing a solution of the first reactant and a second tank 40 containing a solution of the second reactant may be connected to the pipeline in parallel via separate injection tubes 31 and 41 each being equipped with a pump 32 or 42 and valve 33 or 43. A third tank or hopper 50 containing the catalyst may be connected to either injection tube 31 (as shown) or 41 such that the catalyst can be combined with the other components of the treatment composition before injection into the pipeline 20. A fourth tank or hopper 51 containing the emulsifier may be connected to either injection tube 31 (as shown) or 41 such that the emulsifier can be combined with the other components of the treatment composition before injection into the pipeline 20. A fifth tank or hopper 52 containing the foaming agent may be connected to either injection tube 31 or 41 (as shown) such that the foaming agent can be combined with the other components of the treatment composition before injection into the pipeline 20. A sixth tank or hopper 53 containing the solvent or solvent blend may be connected to either injection tube 31 or 41 (as shown) such that the solvent can be combined with the other components of the treatment composition before injection into the pipeline 20. In certain embodiments, a hopper may include at least one additive including, but not limited to the catalyst, the solvent, the emulsifier, and the foaming agent, and the hopper may be configured to combine the at least one additive with one or more of the first reactant and the second reactant as they are introduced into the pipeline 20. In some embodiments, two or more of the solvent, emulsifier, foaming agent, catalyst, first reactant, and second reactant could be stored in a single hopper and introduced together. In other embodiments, additional tanks could be included to store and inject other components and additives (e.g., the pH buffer). In yet other embodiments, the tanks or hoppers containing the catalyst, emulsifier, and/or foaming agent may be connected to the pipeline separately from the injection tubes carrying the first and second reactants. Injection tubes 31 and 41 may merge at a point 60 immediately upstream of the pipeline 20 such that the contents are injected into the pipeline 20 together. Additional valves 70 may be used to regulate the flow of the treatment composition into the pipeline 20. In other embodiments, injection tubes 31 and 41 may be connected to the pipeline separately, such that the first and second reactants may be introduced into the pipeline separately. After the first and second reactants, carrier fluid, catalyst, solvent, emulsifier, and foaming agent are injected into the pipeline 20, the exothermic reaction resulting from the reaction of the first and second reactants may heat at least a portion of the pipeline 20, which may assist in removing deposits of paraffin wax, asphaltenes, scale, hydrates and/or tar from the pipeline. An additional valve 27 may regulate the flow of hydrocarbons mixed with the first and second reactants into the pipeline 20.

As noted above, the delay and/or amount of heat generated in the methods and compositions of the present disclosure may be adjusted for the requirements of a particular operation or treatment, for example, by varying the amounts of the first and second reactants, the amount and/or type of the catalyst, solvent, emulsifier, and foaming agent, and the addition of one or more additional additives (e.g., pH buffer), and other factors. In certain embodiments of the present disclosure, a computerized information handling system or computer program may be designed and/or used to determine the types and/or amounts of the first and second reactants, the delayed-release acid components, the solvent, the emulsifier, the foaming agent, and/or other additives (e.g., pH buffer) to use based on, for example, the amount of heat and/or gas required for a particular treatment operation, the desired delay in generating that heat and/or gas, conditions in the formation or pipeline (e.g., wellbore depth, temperature, pressure, presence of contaminants, etc.), and/or other parameters. For example, the computer program may use input relating to one or more parameters of a treatment operation (e.g., the desired delay in generating heat and/or gas, conditions in the formation or pipeline, etc.), as well as other information, to determine an amount of heat required for at least a portion of the treatment operation prior to completing the treatment operation, and then determine an amount of one or more of a first reactant, a second reactant, a delayed-release acid component, a solvent, an emulsifier, and a foaming agent to use in the treatment operation that will allow at least the first and second reactants to react in an exothermic chemical reaction that produces at least the amount of heat required for at least a portion of the treatment operation. In certain embodiments, the treatment operation includes a subterranean treatment operation. In certain embodiments, the treatment operation includes a pipeline treatment operation (e.g., a treatment to remove deposits of paraffins, asphaltenes, scale, hydrates, and/or tar from at least a portion of a pipeline). Such information handling systems and computer programs may be used prior to the treatment and/or operation to design the parameters of a method or treatment composition of the present disclosure that is tailored the desired results in a particular application. Such systems and/or programs may be incorporated into pre-existing computer systems and/or software programs that are known in the art and used by oilfield service providers and operators to design subterranean treatments and operations.

As would be appreciated by those of ordinary skill in the art, with the benefit of this disclosure, one or more computerized information handling systems may be used to implement the methods disclosed herein. Moreover, each information handling system may include a computer readable media and/or memory to store data generated by the subsystem, preset job performance requirements and standards, and/or a computer program as described above. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer or tablet device, a cellular telephone, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Any suitable processing application software package may be used by the information handling system to process data. In one embodiment, the software produces data that may be presented to the operation personnel in a variety of visual display presentations such as a display. In certain example system, the measured value set of parameters, the expected value set of parameters, or both may be displayed to the operator using the display. For example, the measured-value set of parameters may be juxtaposed to the expected-value set of parameters using the display, allowing the user to manually identify, characterize, or locate a downhole condition. The sets may be presented to the user in a graphical format (e.g., a chart) or in a textual format (e.g., a table of values).

In certain embodiments, different information handling systems may be communicatively coupled through a wired or wireless system to facilitate data transmission between the different subsystems. In certain embodiments, the information handling system may be communicatively coupled to an external communications interface. The external communications interface may permit the data from the information handling system to be remotely accessible (i.e., from a location other than the well site) by any remote information handling system communicatively coupled to the external communications interface via, for example, a satellite, a modem or wireless connections. In one embodiment, the external communications interface may include a router.

An embodiment of the present disclosure is a method including: providing a treatment composition including a carrier fluid, a catalyst, a first reactant, a second reactant, a solvent, an emulsifier, and a foaming agent, wherein the first and second reactants are capable of reacting in an exothermic chemical reaction; and introducing the treatment composition into at least a portion of a conduit or container having a temperature of less than 30° C.

In one or more embodiments described above, wherein the catalyst is selected from the group consisting of: a delayed-release acid component, an encapsulated pH buffer, an encapsulated acid component, an encapsulated persulphate, and any combination thereof.

In one or more embodiments described above, the conduit or container includes a pipeline. In one or more embodiments described above, the treatment composition is introduced into the pipeline using an injection system including: a first tank including the first reactant coupled to the pipeline through a first valve; a second tank including the second reactant coupled to the pipeline through a second valve; and a hopper including at least one additive selected from the group consisting of: the catalyst, the solvent, the emulsifier, and the foaming agent, wherein the hopper is configured to combine the at least one additive with one or more of the first reactant and the second reactant as they are introduced into the pipeline. In one or more embodiments described above, at least one contaminant resides in the conduit or container, the contaminant being selected from the group consisting of: paraffin, asphaltene, tar, scale, a hydrate, and any combination thereof, and the method further includes allowing at least a portion of the contaminant to become dissolved in the solvent or mobilized in the conduit or container. In one or more embodiments described above, the emulsifier is present in an amount sufficient to form an emulsion including the carrier fluid as a continuous phase and the solvent as a dispersed phase or an emulsion including the carrier fluid as the dispersed phase and the solvent as the continuous phase. In one or more embodiments described above, the first reactant includes sodium nitrite and the second reactant includes ammonium chloride. In one or more embodiments described above, the foaming agent is selected from the group consisting of: polyethylene glycol alkyl ether, alkoxylated alcohol ether sulfate, an ethoxylated alcohol, a betaine, a salt of an aliphatic sulfonic acid, and any combination thereof. In one or more embodiments described above, the emulsifier is selected from the group consisting of: a fatty acid, a carbohydrate compound, an ethoxylated alcohol, an ethoxylated nonylphenol, any derivative thereof, and any combination thereof. In one or more embodiments described above, the solvent is a blend of two or more solvents selected from the group consisting of: benzene, toluene, ethylbenzene, xylene, methanol, isopropyl alcohol, aromatic naphtha, and any derivative thereof. In one or more embodiments described above, the methods may further include the steps of: allowing the first and second reactants to react to produce an exothermic reaction and generate a gas; and allowing the foaming agent to form a foamed fluid including the carrier fluid and the generated gas. In one or more embodiments described above, the gas is nitrogen. In one or more embodiments described above, the carrier fluid is an emulsion including an aqueous continuous phase and a dispersed phase including the solvent.

An embodiment of the present disclosure is a method including: providing a treatment composition including a carrier fluid, a catalyst, a first reactant, a second reactant, a solvent, an emulsifier, and a foaming agent, wherein the first and second reactants are capable of reacting in an exothermic chemical reaction; and introducing the treatment composition into at least a portion of a subterranean formation including a contaminant selected from the group consisting of: scale, a hydrate, and any combination thereof.

In one or more embodiments described above, the first reactant includes sodium nitrite and the second reactant includes ammonium chloride. In one or more embodiments described above, the catalyst is a delayed-release acid component including at least one compound selected from the group consisting of: a lactate, a lactic acid derivative, a glycerol ester, a glycerol polyester, an aliphatic polyester, a poly(lactide), a poly(glycolide), a poly(ε-caprolactone), a poly(hydroxy ester ether), a poly(hydroxybutyrate), an aliphatic polycarbonate, a poly(orthoester), a poly(amino acid), a poly(ethylene oxide), a polyphosphazene, and any combination thereof. In one or more embodiments described above, one or more of the first reactant, the second reactant, or the catalyst are provided in an amount that is based at least in part on a predetermined amount of heat to be produced by the exothermic chemical reaction.

An embodiment of the present disclosure is a method including: providing a treatment composition including a carrier fluid, a catalyst, a first reactant, a second reactant, a solvent, an emulsifier, and a foaming agent, wherein the first and second reactants are capable of reacting in a chemical reaction to produce a gas; introducing the treatment composition into at least a portion of a conduit or container including a contaminant selected from the group consisting of: paraffin, asphaltene, tar, scale, a hydrate, and any combination thereof, wherein at least the portion of the conduit or container has a temperature of less than 30° C.; allowing the first and second reactants to react to produce an exothermic reaction; allowing heat from the exothermic reaction to at least partially degrade at least a portion of the contaminant; and allowing the solvent to at least partially degrade or dissolve at least a portion of the contaminant.

In one or more embodiments described above, the first reactant includes sodium nitrite and the second reactant includes ammonium chloride. In one or more embodiments described above, one or more of the first reactant, the second reactant, or the catalyst are provided in an amount that is based at least in part on a predetermined amount of gas to be produced by the chemical reaction.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
   providing a treatment composition comprising a carrier fluid, a catalyst, a first reactant, a second reactant, a solvent, an emulsifier, and a foaming agent, wherein the first and second reactants are capable of reacting in an exothermic chemical reaction, and at least one of the first reactant and the second reactant is embedded in a solid matrix including a material to delay release of the reactant or is encapsulated with an encapsulating material to form a solid capsule to delay release of the reactant; and
   introducing the treatment composition into at least a portion of a conduit or container while the portion of the conduit or container is at a temperature of less than 30° C., the conduit or container having a contaminant comprising scale, a hydrate, or both, residing therein;
   whereafter at least a portion of the scale, the hydrate or both becomes dissolved in the solvent or mobilized in the conduit or container.

2. The method of claim 1 wherein the catalyst is selected from the group consisting of a delayed-release acid component, an encapsulated pH buffer, an encapsulated acid component, an encapsulated persulphate, and any combination thereof.

3. The method of claim 1 wherein the conduit or container comprises a pipeline.

4. The method of claim 3 wherein the treatment composition is introduced into the pipeline using an injection system comprising:
   a first tank comprising the first reactant coupled to the pipeline through a first valve;
   a second tank comprising the second reactant coupled to the pipeline through a second valve; and
   a hopper comprising at least one additive selected from the group consisting of the catalyst, the solvent, the emulsifier, and the foaming agent, wherein the hopper is configured to combine the at least one additive with one or more of the first reactant and the second reactant as they are introduced into the pipeline.

5. The method of claim 1 wherein the conduit or container also has residing therein an additional contaminant selected from the group consisting of paraffin, asphaltene, tar, and any combination thereof, and at least a portion of the additional contaminant also becomes dissolved in the solvent or mobilized in the conduit or container.

6. The method of claim 1 wherein the emulsifier is present in an amount sufficient to form an emulsion comprising the carrier fluid as a continuous phase and the solvent as a dispersed phase or an emulsion comprising the carrier fluid as the dispersed phase and the solvent as the continuous phase.

7. The method of claim 1 wherein the first reactant comprises sodium nitrite and the second reactant comprises ammonium chloride.

8. The method of claim 1 wherein the foaming agent is selected from the group consisting of: polyethylene glycol alkyl ether, alkoxylated alcohol ether sulfate, an ethoxylated alcohol, a betaine, a salt of an aliphatic sulfonic acid, and any combination thereof.

9. The method of claim 1 wherein the emulsifier is selected from the group consisting of a fatty acid, a carbohydrate compound, an ethoxylated alcohol, an ethoxylated nonylphenol, any derivative thereof, and any combination thereof.

10. The method of claim 1 wherein the solvent is a blend of two or more solvents selected from the group consisting of: benzene, toluene, ethylbenzene, xylene, methanol, isopropyl alcohol, aromatic naphtha, and any derivative thereof.

11. The method of claim 1 wherein, subsequent to introducing the treatment composition into at least the portion of the conduit or container:
the first and second reactants react to produce an exothermic reaction and generate a gas; and
the foaming agent forms a foamed fluid comprising the carrier fluid and the generated gas.

12. The method of claim 11, wherein the gas is nitrogen.

13. The method of claim 1, wherein the carrier fluid is an emulsion comprising an aqueous continuous phase and a dispersed phase comprising the solvent.

14. A method comprising:
providing a treatment composition comprising a carrier fluid, a catalyst, a first reactant, a second reactant, a solvent, an emulsifier, and a foaming agent, wherein the first and second reactants are capable of reacting in an exothermic chemical reaction, and at least one of the first reactant and the second reactant is embedded in a solid matrix including a material to delay release of the reactant or is encapsulated with an encapsulating material to form a solid capsule to delay release of the reactant, and
introducing the treatment composition into at least a portion of a subterranean formation having a contaminant comprising scale, a hydrate, or both, residing therein.

15. The method of claim 14 wherein the first reactant comprises sodium nitrite and the second reactant comprises ammonium chloride.

16. The method of claim 14 wherein the catalyst is a delayed-release acid component comprising at least one compound selected from the group consisting of: a lactate, a lactic acid derivative, a glycerol ester, a glycerol polyester, an aliphatic polyester, a poly(lactide), a poly(glycolide), a poly(ε-caprolactone), a poly(hydroxy ester ether), a poly (hydroxybutyrate), an aliphatic polycarbonate, a poly(orthoester), a poly(amino acid), a poly(ethylene oxide), a polyphosphazene, and any combination thereof.

17. The method of claim 14 wherein one or more of the first reactant, the second reactant, or the catalyst are provided in an amount that is based at least in part on a predetermined amount of heat to be produced by the exothermic chemical reaction.

18. A method comprising:
providing a treatment composition comprising a carrier fluid, a catalyst, a first reactant, a second reactant, a solvent, an emulsifier, and a foaming agent, wherein the first and second reactants are capable of reacting in a chemical reaction to produce a gas, and at least one of the first reactant and the second reactant is embedded in a solid matrix including a material to delay release of the reactant or is encapsulated with an encapsulating material to form a solid capsule to delay release of the reactant; and
introducing the treatment composition into at least a portion of a conduit or container while the portion of the conduit or container is at a temperature of less than 30° C. and has a contaminant comprising scale, a hydrate, or both, residing therein;
whereafter the first and second reactants will react to produce an exothermic reaction, and heat from the exothermic reaction will at least partially degrade at least a portion of the scale, the hydrate, or both; and
whereafter the solvent will at least partially degrade or dissolve at least a portion of the scale, the hydrate, or both.

19. The method of claim 18 wherein the first reactant comprises sodium nitrite and the second reactant comprises ammonium chloride.

20. The method of claim 18 wherein one or more of the first reactant, the second reactant, or the catalyst are provided in an amount that is based at least in part on a predetermined amount of gas to be produced by the chemical reaction.

* * * * *